United States Patent
Paredes

[19]
[11] Patent Number: 5,973,619
[45] Date of Patent: Oct. 26, 1999

[54] AUTOMATED VEHICLE DISPATCH AND PAYMENT HONORING SYSTEM

[76] Inventor: Alexis Paredes, 1901 Park Lake St., Orlando, Fla. 32803

[21] Appl. No.: 08/872,084

[22] Filed: Jun. 10, 1997

[51] Int. Cl.$^6$ .................................................. G08G 1/123
[52] U.S. Cl. .......................... 340/994; 235/384; 340/434; 705/5
[58] Field of Search ..................... 340/994, 988, 340/434, 995; 235/384; 705/5, 13; 701/200, 211, 1

[56] References Cited

U.S. PATENT DOCUMENTS

| | | | |
|---|---|---|---|
| 4,092,718 | 5/1978 | Wendt | 340/994 |
| 4,928,099 | 5/1990 | Drake | 340/307 |
| 5,168,451 | 12/1992 | Bolger | 340/994 |
| 5,197,009 | 3/1993 | Hoffman, Jr. et al. | 340/995 |
| 5,726,885 | 3/1998 | Klein et al. | 235/384 |
| 5,732,398 | 3/1998 | Tagawa | 705/5 |
| 5,799,263 | 8/1998 | Culbertson | 340/994 |

FOREIGN PATENT DOCUMENTS

| 2674355 | 9/1992 | France | 340/994 |
|---|---|---|---|

*Primary Examiner*—Brent A. Swarthout
*Attorney, Agent, or Firm*—McHale & Slavin PA

[57] ABSTRACT

An automated vehicle dispatch and payment honoring system which is comprised of a computerized system with specialized software which enables a user to select a particular Taxi or vehicular transport company from a menu, along with the desired destination and number of passengers traveling. The software provides multi-lingual, user-friendly menu driven choices, which might include advertising for restaurants, hotels, etc. The system then displays the approximate fare and provides alternative forms of payment which are honored by that particular transport company. This system might include individualized computerized stands or wall unit strategically positioned in such crowded places as airports, hotels, and banks. Such stands could electronically receive and scan credit or debit cards. The software system might also be accessed via computer or telephonic link. The finalized request for service is relayed to a dispatcher via telecommunication, satellite, or computer link. The dispatcher can then route the appropriate vehicle to the requesters location whereby a pre-printed credit voucher, as verified and generated by the system could be exchanged for the transportation services rendered.

7 Claims, 6 Drawing Sheets

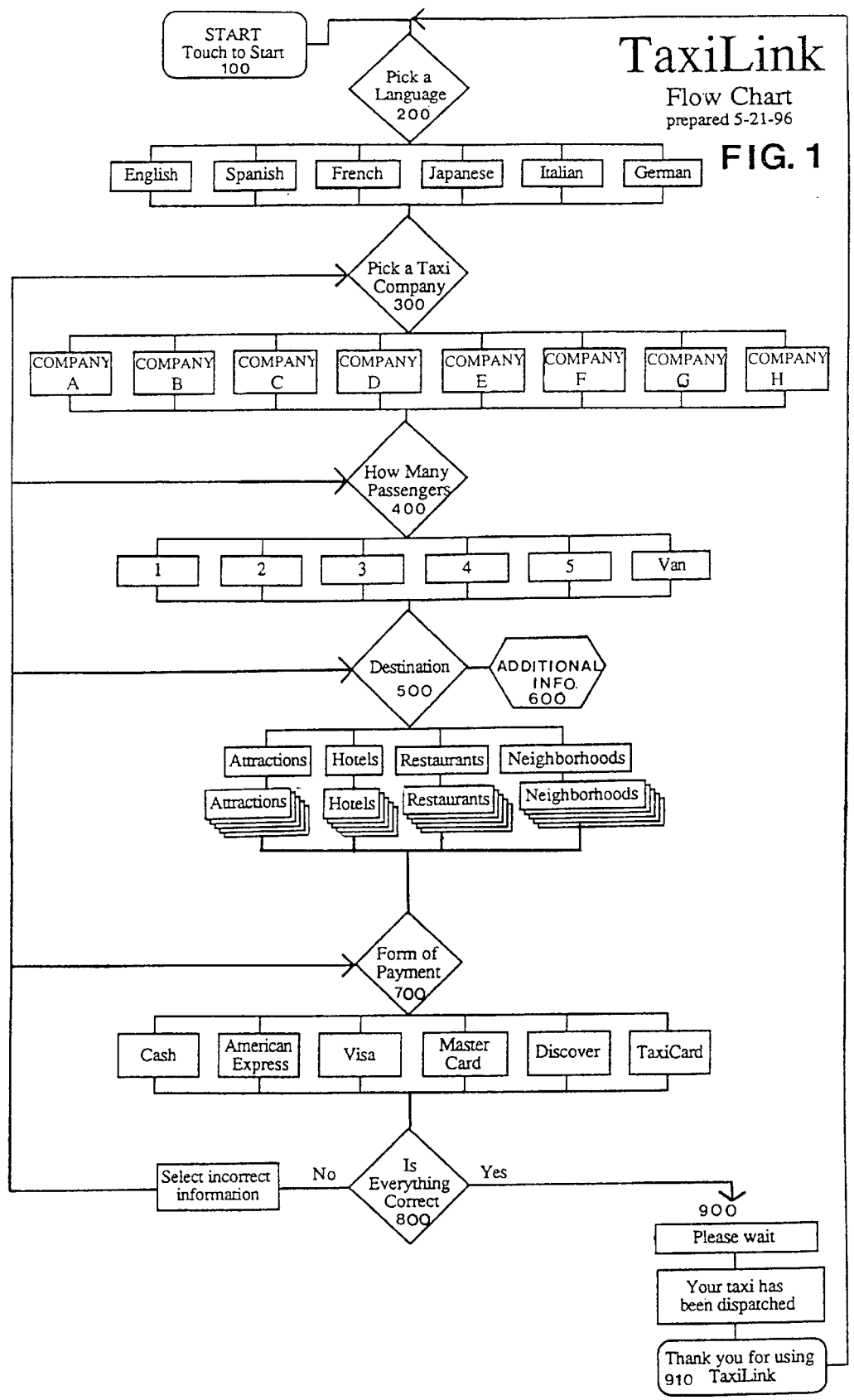

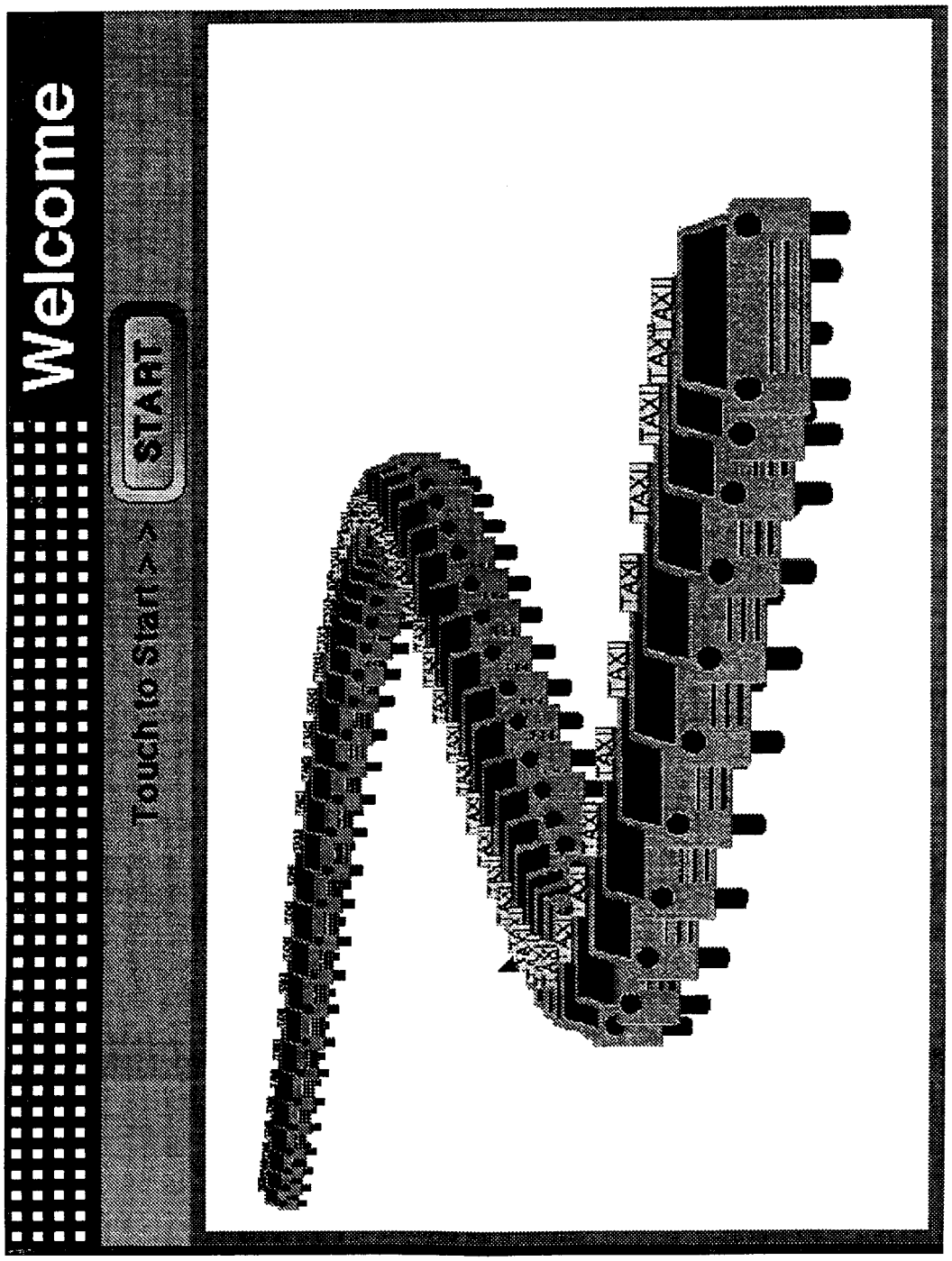
Taxilink Program Fig. 1A

TAXI CARD. The TaxiLINK Card offers corporate customers a direct billing option for payment of services rendered within a billing cycle. Personal customers can also use the prepaid Taxilink Card to debit an account for services.

EQUIPMENT

FIXTURE UNIT 2000 A

TYPES OF EMBODIMENTS

FIXTURE UNIT 2000 A — WALL MOUNTED UNIT 2000 B — BANK UNIT 2000 C — HOST UNIT 2000 D — INTERACTIVE T.V. 2000 E — ON-LINE 2000 F

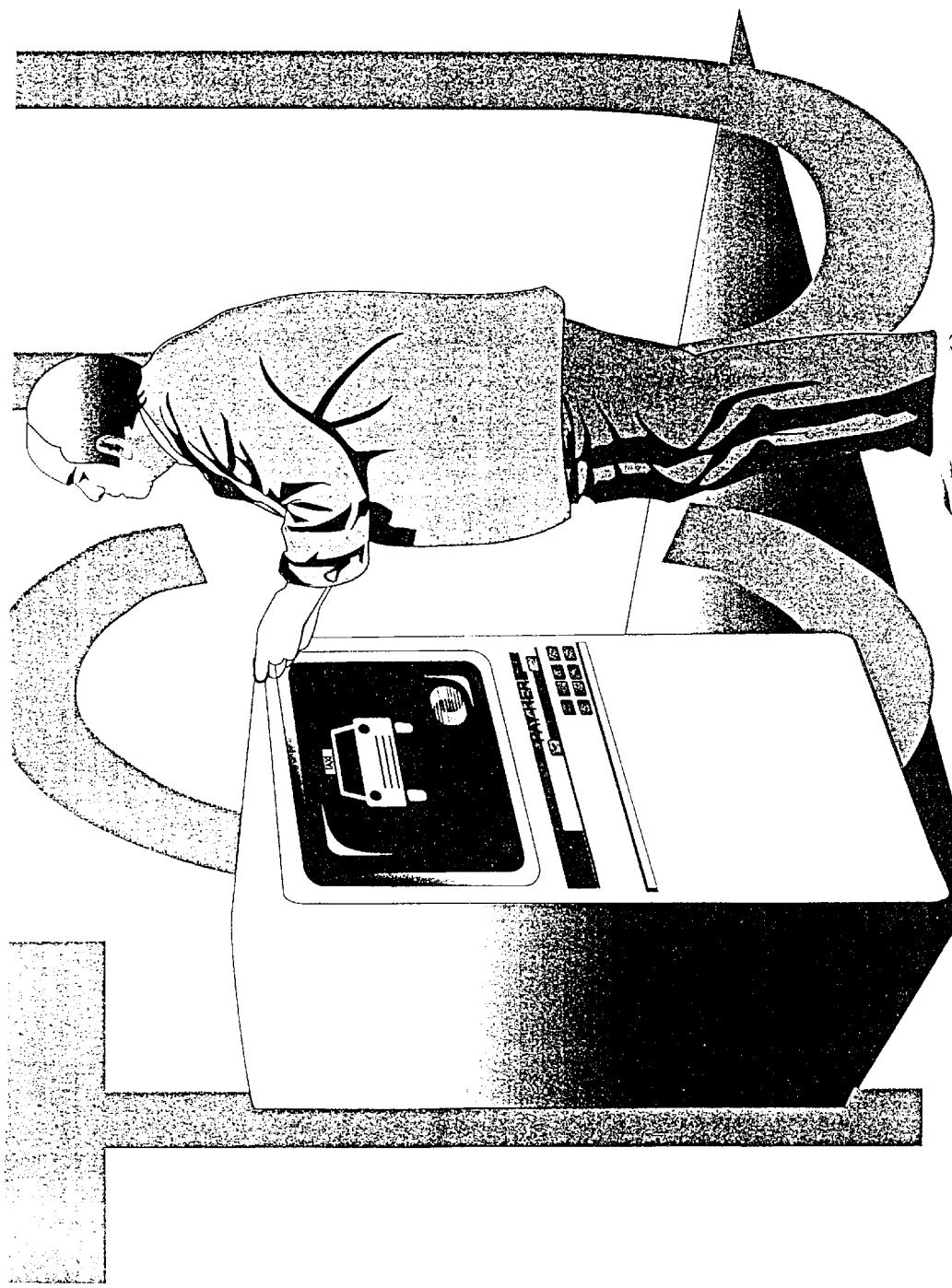

AUTOMATED VEHICLE DISPATCH AND PAYMENT HONORING SYSTEM

FIELD OF THE INVENTION

The present invention involves an Automated Vehicle Dispatch and Payment Honoring system distributed to serve numerous locations and users. This computerized vehicle stand unit and/or software program reprocesses a request for service by permitting user to enter and/or change selections on types of transportation companies, destinations, forms of payment, and number of passengers travelling before registering a dispatch or service to an authorized company on the system. The present invention is configured to extend such services as taxis, limousines, private cars, and buses in foreign languages to one or more companies on the system.

BACKGROUND OF THE INVENTION

It is known in the prior art to transmit requests for services for a multiplicity of remote call boxes by radio channel transmission, transmitting alarms, encoding signals and for summoning emergency services to a central dispatch location. Such prior art systems may transfer messages unidirectional or bidirectional, by radio channel or in digital form. However, they are generally unitary systems which can serve only one company. This invention differentiates itself from the prior art by offering a host computerized vehicle stand unit designed to serve numerous companies and honor payment of services by credit card or by a host card, i.e. a TAXILINK CARD as shown in FIG. 1B. The example Taxilink card offers corporate customers a direct billing option for payment of services rendered within a billing cycle. Personal customers can also use the prepaid Taxilink Card to pay for services. The present invention, among other aspects, further differentiates itself from the prior art by providing for transmission of the request for services and payment of services through a telecommunication and satellite link.

The prior art which primarily uses single communication channel or a digital signals is also strictly limited to one language for entering request for services. The present invention offers the user menu-type options including many foreign languages along with a better means to assist and inform the user on selecting a destination and payment option before making a request for service. Each system unit operates independent and therefore is unaffected by its geographical relationship to one another.

As an example of the prior art, U.S. Pat. No. 4,928,099 for a TELEMETRY SYSTEM FOR AUTOMATED REMOTE CALLING AND CENTRAL DISPATCH OF SERVICES, PARTICULARLY TAXICABS, discloses a telemetry system distributed geographically via call boxes which synchronously transmits digital taxicab requests. Each call box repeats its transmission at intervals to insure non-conflicting receipt of the message. A central computer receives and processes the messages to eliminate redundancy, display requests to a dispatcher service, and log all requests and responses thereto. The call box can also send messages regarding vandalism, low power, and/or the system's general on-line status.

U.S. Pat. No. 5,168,451 for a USER RESPONSIVE TRANSIT SYSTEM discloses a user responsive transit system which includes a number of service request terminals located at intervals in areas served by the transit system. Passengers use the service request terminals to transmit a request to a central dispatch controller, the controller receives the request and automatically dispatches the most efficient vehicle by calculating the total travel distance in relation to previously assigned dispatches. A service request is dispatched to the particular vehicle which would have the minimum added travel distance. A geographical display map of the area with the various dispatch requests can be provided for viewing the vehicle operator. The vehicle operator can thereby determine the most efficient route to service the dispatch requests.

Accordingly, what is needed in the field is a computerized vehicle summoning stand or unit which functions independently from other units and can send request information to any of a variety of companies. The unit would contain specialized software which prompts the user for such information including the language desired for the transaction, the number of passengers, destination, and the type of vehicle desired. The approximate fare could then be calculated and displayed and the unit would be capable of receiving and processing payment of the fare, with a voucher being issued to the user. The free-standing unit might similarly be incorporated into a wall unit or existing computerized access system, with a telecommunication, computerized or satellite link being used to convey the vehicle request and payment information.

SUMMARY OF THE INVENTION

The present invention embodies a computerized system which enables customers to select a transportation company, in this example a taxi company, from a menu of all permitted and participating companies. The user can choose a desired destination and enter the number of passengers travelling. The system will then display the approximate fare along with forms of payment honored by the taxi company selected. Specialized software enables a customer to make any changes prior to the selection being dispatched as a request for service. The system uses a telecommunication or satellite link to relay the request to the dispatcher while a receipt for the operation is printed. The system improves foreign customer service by offering multi-lingual instructions along with provisions for advertising.

The way in which the system displays all of the destinations will inform and encourage the extended use of taxi service. Along with honoring credit cards, the system features a Taxilink card (FIG. 1b) account for corporate or personal use which can be paid by a direct bill or a debit account. The frequent use of the Taxilink card enables drivers to gain corporate market share by encouraging repeat business. The Taxilink card will expedite the typical transactions and dispatch times. With cashless fare transaction, driver safety will be improved in that the financial incentive for assault and robbery is reduced. Safety is also improved at busy curbsides where this system improves traffic congestion problems and customer safety by organizing passengers and fares for ready pick-up. This computerized taxi stand unit and software program can replace taxi hard stands, thereby freeing curbspace for metered parking revenue back to the city.

Steps 100–910 show various screens which appear as a result of using the program of FIG. 1.

Figure 1B:
FIG. 1 shows a flowchart of the vehicle request, or "Taxilink" software, as executed by the computer and hardware components of the vehicle dispatch and payment honoring system.
FIG. 1A shows a beginning menu screen for the program of FIG. 1.

FIG. 1B shows an example embodiment of a Taxicard for automated payment of transportation services.

Figure 2:
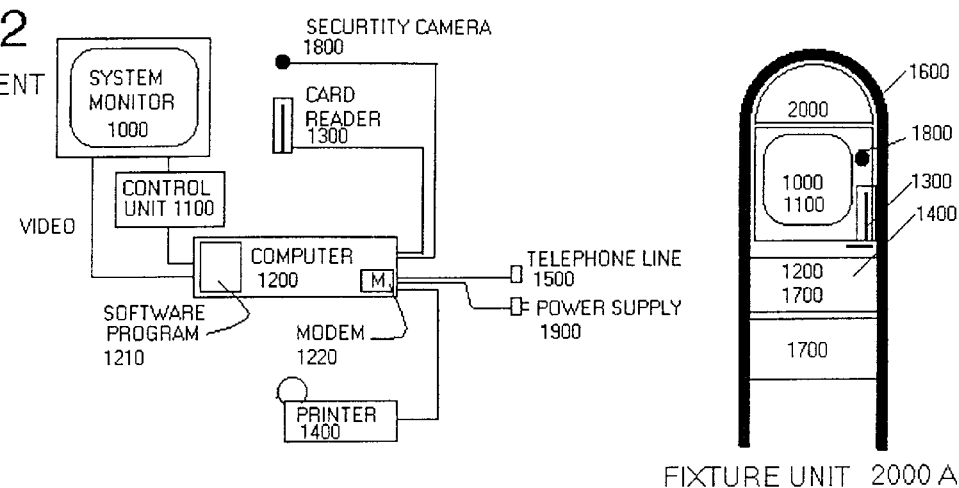

FIG. 2 shows a block diagram of example hardware utilized by a vehicle unit stand.

Figure 3:
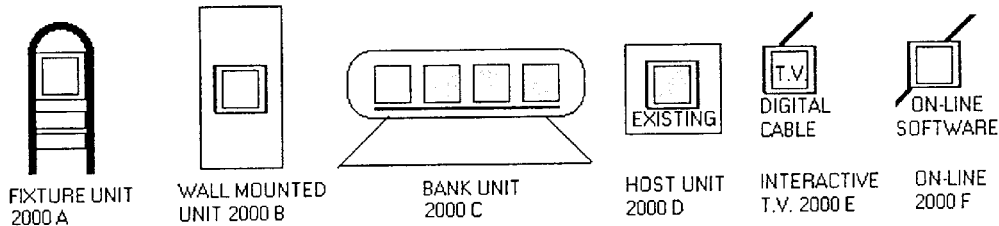

FIG. 3 shows a series of embodiments for implementing the vehicle dispatch system as described above.

FIG. 3A shows an embodied free-standing vehicle dispatch and payment honoring system.

Figure 3B:
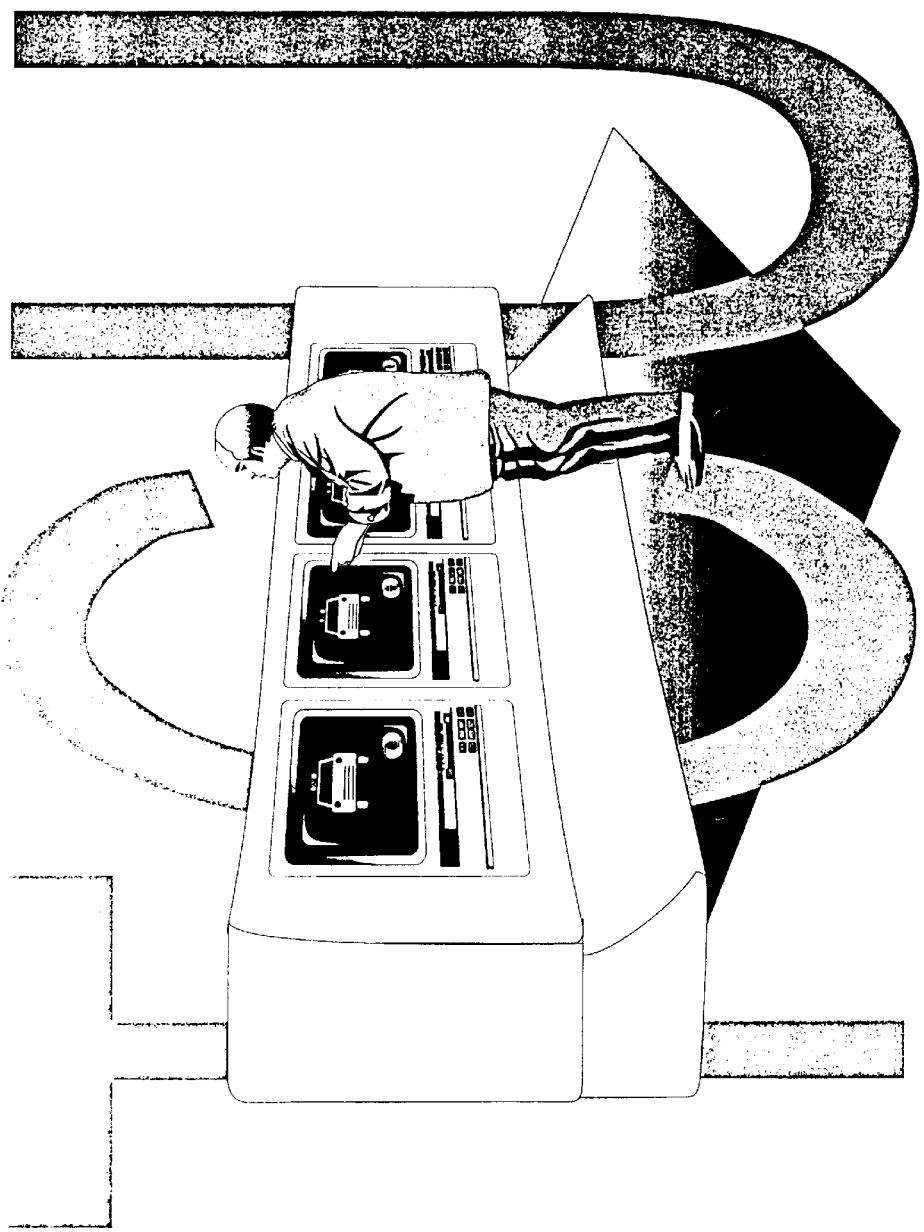

FIG. 3B shows an embodied multi-screened vehicle dispatch and payment honoring system as might typically be found in a bank or other such institution.

DETAILED DESCRIPTION OF THE PREFERRED EMBODIMENT

Although the invention has been describe in terms of a specific embodiment, it will be readily apparent to those skilled in this art that various modifications, rearrangements and substitutions can be made without departing from the spirit of the invention. The scope of the invention is defined by the claims appended hereto.

Referring now to FIGS. 1, 1A, and the flowchart steps 100–910, the flow chart shown exhibits the Taxilink software program executed by the computer and components of the automated taxi dispatch and payment honoring system in accordance with the present invention. The flow steps are described below:

| FLOW CHART STEP: | DESCRIPTION: |
|---|---|
| 100 | Displays an animated graphic screen saver, with solicitation and instruction messages and an active START button. |
| 200 | Selection of Language screen exhibits all foreign language options for instruction. |
| 300 | Presents all authorized taxi companies, rotating advertisements and instructions. |
| 400 | Instructs user to enter the number of passengers travelling. |
| 500 | Displays all advertised Destination options in their respective category which will illuminate when active. |
| 600 | Additional information on destination and change pick option. |
| 700 | Form of Payment screen exhibits an approximate fare, instructions and all payment options honored by the system. |
| 800 | The Conformation screen exhibits and accepts any change to previous selections along with playing a prerecorded video message. |
| 900 | Dispatch of Service, places a dispatch call and displays approximate arrival time of taxicab or other requested vehicle. |
| 910 | Displays exit message. |

As per FIG. 1A and step 100, a customer would touch the active START button on the screen to begin the Taxilink program. The first option 200 will allow the user to select the instructions in the language desired from a menu of language. On the following screen, all authorized taxi companies would appear along with other information and/or advertisements. On the following screen, all authorized and/or advertisements. Here the user will "Select a Company" 300 which will service the request. The next screen 400 allows the user to enter the "Number of Passengers" travelling. This feature will enable the contacted dispatcher to send the correct vehicle to properly service the request.

On the next screen 500, a map of "Destinations" appears along with the main category types (i.e.: Attractions, Restaurants, Hotels, Neighborhoods, etc.) All advertised destinations will appear under the category selected. Here the customer can select a desired destination, request Additional Information or change the user's pick. If "Additional Information" is selected, the next screen 600 will offer more details on scheduled events, type of facility or any other advertisement which will serve to better inform the customer.

After the destination is entered the following screen 700 will display the approximate fare along with all forms of payment honored by the system. A "Confirmation" screen 800 will appear next displaying all the prior selections along with a prerecorded video message "Thank you for using Taxilink. Please review your selections before continuing. The customer can make changes to any prior selection, if he or she desires. The system will then make a "Dispatch of Service" call to the respective dispatcher via telecommunication or satellite link. The dispatcher will receive a voice or display message from the Taxilink system stating all the information entered along with a request for response time. This response time will then appear on the screen 900 while a print of the entire transaction is produced. A final exit message 910 will confirm the end.

Referring now to FIG. 1B, an example of a Taxilink card is shown for automatic debit of a transport fare. After entering the Taxilink card into an appropriate slow or reader, the system will expedite the process by displaying the "Destinations" screen 500, screen 600; then the "Confirmation" screen 800; followed by "Dispatch of service" screen 900; final exit screen 910. The Taxilink card offers corporate customers a direct billing option for payment of services rendered within a billing cycle.

Referring now to FIG. 2, an example hardware configuration is shown for dispatch stand unit and payment honoring system. The Operational System Monitor 1000 displays to the user all service options, instructions, and advertisements. The control unit 1100 allows for the input of a selection. This information is then processed by the computer 1200 using the TAXILINK software program 1210. Card Reader 1300 is provided to process credit or debit card accounts depending on the type of payment desired. This system will transmit the information to a dispatcher via telecommunication lines 1500. A modem 1220 to contained to expedite additional bidirectional communication. A printer 1400 will produce a receipt for the entire transaction. All of these component parts are embodied in a Fixture Unit 1600 along with provisions for Advertisement 1700 and Security Camera 1800 system. A Power Connection 1900 supplies the unit and Display light 2000 with electricity.

Referring now to FIG. 3, 3A, and 3B, possible distribution embodiments for the system are shown. The Automated Vehicle Dispatch And Payment Honoring System in accordance with the present invention is distributed to serve numerous locations and users. Request for services can be processed via several different types of remote units. The fixture Unit 2000A, as shown in FIG. 3A, is designed as a standing unit to compliment the surroundings which it occupies. This unit's design implements the same types of finishes which may exist in the intended area (i.e. lobbies, banks, theme parks, restaurants, stadiums, etc.). FIG. 3 additionally shows a Wall Mounted Unit 2000B can offer service to areas where space is limited. Another type of embodiment is a Bank Unit System 2000C, as shown in FIG. 3B, which is designed to provide more service to high volume areas (i.e.: airports, convention centers, theme parks, sporting facilities, etc.).

In the event there is already an Existing Host Unit 2000D, the TAXILINK program can process requests for service from the same unit via incorporation of the Taxilink software and telecommunication connection. Another type of host system, the Interactive Television System 2000E, can reach more customers by offering the service to their homes. The ability to prearrange a request for service from another city, state or country can be offered through the internet via the On-Line 2000F, which will extend the system's use worldwide.

The benefits of the invention, include but are not limited to the following:

Provides for a more informed customer

Displays all permitted Taxi companies at a glance

Provides additional information on prospective destination.

Displays an Approximate fare

Improves driver safety

Improves traffic congestion

Increases customer safety

Promotes taxi industry

Promotes commerce

Improves services to foreign customers

Allows taxi companies to better target their advertisement to their prospective customers Enables taxi companies to secure corporate/personal service accounts Give local merchants another means to prospective customers Provides for more Civic Directories Increase parking revenue by reinstating metered parking stalls Reduces the parking demand at a facility Reduces the risk of taxi fare pirating Increases dispatcher's efficiency While the above described embodiments disclose a taxi stand unit and related software program, the invention could readily be used to summons any other type of transportation service, including but not limited to shuttlebuses, limousines, private cars for hire, city buses and other types of vehicles for hire. This would involve yet another menu choice of the type of service desired. The dispatcher would then route the appropriate vehicle to the requester, or the appropriate vehicle might directly respond via receiving equipment on-board the vehicle.

Also, as mentioned above, this automated vehicular requesting service could be used worldwide via on-line connection to the internet or some other board-coverage transmission medium. The user might maintain On-Line 2000F interface software and use it to send an appropriate request to a corresponding dispatching service. Alternatively, the user could access the interface software via an internet or telephonic connection whereby the user is cued for information and an appropriate request for a vehicle is processed. This would allow the user to place a request from half-way across the world for a specific date and time, thereby alleviating this extra worry and hassle from the rigors of travel.

Moreover, while private cars might be hailed by this system, the user is able to choose from a reputable transport company without being accosted by unscrupulous private car operators which are illegal in some areas. Foreign travelers are often targets for overcharging and inefficient routing by some transport operators. By specifically being able to request a vehicle from a chosen company, the user can ignore solicitations from other drivers with the security of knowing that his chosen vehicle will arrive as requested.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and feature thereof.

I claim:

1. A method as implemented on a computer system for use by a consumer, said method for delivering instructional messages to said consumer regarding private transportation companies and estimated costs for hiring said transportation company for transporting said consumer to listed destinations and further providing an automated taxi dispatch and payment honoring system, said method comprising the steps of:

(1) displaying a list of authorized transportation companies for selection by the operator of the computer;

2) prompting the consumer to insert the amount of passengers to be traveling in the transportation vehicle;

(3) graphically illustrating destination locations;

(4) displaying the approximate fare for the number of passengers promoted to a selected destination and types of payment options honored by said selected company;

(5) initiating a dispatch call for an available taxi from said selected taxi company;

(6) estimate the approximate arrival time for said dispatched taxi.

2. The method of claim 1, wherein said instruction messages may be delivered in various foreign languages.

3. The method of claim 1, wherein said destination locations selected on said computer system illuminate when selected.

4. The method of claim 1 including the step of displaying additional information on said destination locations.

5. The method of claim 1 wherein said destination locations is characterized as attractions, restaurants, hotels and neighborhoods.

6. The method of claim 1 wherein said graphically illustrating destination locations includes an enlarged map with streets names and directions to said locations.

7. The method of claim 1 wherein a confirmation display of the transportation company, fare, number of passengers, and selected destination is illustrated.

\* \* \* \* \*